United States Patent
Kondo et al.

(10) Patent No.: US 10,227,043 B2
(45) Date of Patent: Mar. 12, 2019

(54) VIEWING CONTROL DEVICE FOR VEHICLE

(71) Applicant: KABUSHIKI KAISHA TOKAI-RIKA-DENKI-SEISAKUSHO, Aichi (JP)

(72) Inventors: Juntaro Kondo, Aichi (JP); Takashi Nagao, Aichi (JP); Shinichi Miyazaki, Aichi (JP); Fumikazu Kobayashi, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 15/528,624

(22) PCT Filed: Nov. 12, 2015

(86) PCT No.: PCT/JP2015/081879
§ 371 (c)(1),
(2) Date: May 22, 2017

(87) PCT Pub. No.: WO2016/084618
PCT Pub. Date: Jun. 2, 2016

(65) Prior Publication Data
US 2017/0259741 A1    Sep. 14, 2017

(30) Foreign Application Priority Data
Nov. 25, 2014    (JP) .................................. 2014-237593

(51) Int. Cl.
*B60R 1/02*    (2006.01)
*B60R 1/06*    (2006.01)
(Continued)

(52) U.S. Cl.
CPC ................ *B60R 1/025* (2013.01); *B60R 1/06* (2013.01); *B60R 1/072* (2013.01); *B60R 1/12* (2013.01);
(Continued)

(58) Field of Classification Search
CPC .. B60R 1/025; B60R 1/06; B60R 1/08; B60R 1/087; B60R 1/072
See application file for complete search history.

(56) References Cited

U.S. PATENT DOCUMENTS

| 6,390,631 B1 | 5/2002 | Lang et al. |
| 2005/0030654 A1 | 2/2005 | Kurumagawa et al. |

(Continued)

FOREIGN PATENT DOCUMENTS

| EP | 1114750 A2 | 7/2001 |
| JP | H06-023829 U | 3/1994 |

(Continued)

OTHER PUBLICATIONS

System Adjusting Vehicle Outside Mirror and Electric Vehicle, JP2000-225895A, English translation, machine, Published Aug. 15, 2000; (Year: 2000).*

(Continued)

*Primary Examiner* — Anne M Antonucci
*Assistant Examiner* — Renee LaRose
(74) *Attorney, Agent, or Firm* — Roberts Mlotkowski Safran Cole & Calderon, P.C.

(57) ABSTRACT

An in-out motor changes a field of view of vehicle surroundings for a vehicle occupant. When a predetermined condition is satisfied before a predetermined change condition for changing the field of view is satisfied, an ECU controls the in-out motor via a mirror surface operation driver so as to change the field of view to a predetermined preparatory field.

4 Claims, 9 Drawing Sheets

(51) Int. Cl.
  *B60R 1/072* (2006.01)
  *B60R 1/12* (2006.01)
(52) U.S. Cl.
  CPC . *B60R 2001/1253* (2013.01); *B60R 2300/802* (2013.01)

(56) References Cited

U.S. PATENT DOCUMENTS

2007/0263301 A1* 11/2007 Agrest .................... B60R 1/025
  359/843
2010/0039720 A1* 2/2010 Lee ......................... B60R 1/025
  359/843
2012/0022749 A1* 1/2012 Clegg .................... B60R 1/025
  701/49

FOREIGN PATENT DOCUMENTS

| JP | 2000-225895 A | 8/2000 |
| JP | 2005-035468 A | 2/2005 |
| JP | 2010-208374 A | 9/2010 |
| WO | 95/05293 A1 | 2/1995 |

OTHER PUBLICATIONS

International Search Report issued in a corresponding application PCT/JP2015/081879 dated Jan. 26, 2016.
The Extended European Search Report issued in the corresponding EP Patent Application No. 15863689.4 dated Mar. 20, 2018.

\* cited by examiner

VIEWING CONTROL DEVICE FOR VEHICLE

CROSS-REFERENCE TO RELATED APPLICATIONS

The present application is a U.S. National Phase of PCT/JP2015/081879 filed on Nov. 12, 2015 claiming priority to Japanese Patent application No. 2014-237593 filed Nov. 25, 2014. The disclosure of the PCT Application is hereby incorporated by reference into the present Application.

TECHNICAL FIELD

The present invention relates to a view control device for a vehicle that controls a viewing device for viewing of the vehicle surroundings, such as a door mirror, a camera or the like.

BACKGROUND ART

Japanese Utility Model Application Laid-Open (JP-U) No. H6-23829 proposes a back mirror device for a vehicle, which is equipped with a mirror driving mechanism that receives turning direction signals from a direction indicator, a steering wheel or the like and moves a back mirror in respective directions.

Japanese Patent Application Laid-Open (JP-A) No. 2010-208374 proposes an angle control device for a vehicle door mirror that is equipped with: an acceleration detector that detects when the vehicle accelerates by at least a certain acceleration from a certain speed within a certain duration; a steering angle range detector that detects when a steering angle of the steering of the vehicle is within a certain range within a certain duration; and a turn signal operation detector that detects when a right turn signal of the vehicle operates within a certain duration. When it is detected by the detectors that the vehicle has accelerated by at least the certain acceleration from the certain speed within the certain duration, the steering angle of the steering of the vehicle is within the certain range within the certain duration, and the right turn signal of the vehicle is operated within the certain duration, the angle control device for a vehicle door mirror performs control such that an angle of a door mirror at the right side of the vehicle opens outward from some angle by a certain angle for a certain duration.

SUMMARY OF INVENTION

Technical Problem

Thus, JP-U No. H6-23829 and JP-A No. 2010-208374 recite that a field of view according to a vehicle door mirror device is changed when plural conditions are satisfied. However, because there are differences in field of view settings between different people, it may take some time to change the field of view to a target field of view.

The present invention has been made in consideration of the situation described above, and an object of the invention is to enable a shorter duration of changing when a field of view is changed.

Solution to Problem

In order to achieve the object described above, the present invention provides: a change unit that changes a field of view of vehicle surroundings for a vehicle occupant; and a control unit that, in a case of establishment of a predetermined condition that is before establishment of a preset change condition under which the viewing range is to be changed, controls the change unit so as to change the field of view to a predetermined preparatory field.

According to an aspect of the present invention, the change unit changes the field of view of the vehicle surroundings for a vehicle occupant. For example, if the vehicle surroundings are being viewed with a mirror surface, a camera or the like, the change unit changes the field of view by driving an actuator such as a motor or the like to change a mirror surface position, an imaging direction or the like.

The control unit controls the change unit to change the field of view to the predetermined preparatory field when the predetermined condition is satisfied, before the predetermined change condition for changing the field of view is satisfied. For example, the predetermined condition is that the field of view is changed to the preparatory field when a subset of conditions among plural conditions for the change unit to change the field of view is satisfied. That is, the field of view is provisionally changed to the preparatory field. Therefore, when the field of view is changed subsequently, a duration of changing to reach the target is not lengthened and may be shortened.

A standard field of view may be used as the preparatory field. If a side of the vehicle to the rear of the door mirror or the like is to be seen, for example, a field in which a portion of the side of the rear of the vehicle can be seen may be used.

When the change condition is satisfied after the change to the preparatory field, the control unit may further control the change unit so as to change the field of view in association with turning of the vehicle. In this case, as the predetermined condition, the control unit may control the change unit so as to change to the preparatory field when a turn signal switch is switched on and, as the change condition, the control unit may control the change unit so as to change the field of view in association with turning when, in a state in which the turn signal switch is switched on, a steering angle that is at least a predetermined steering angle is detected by a detector that detects the steering angle.

The change unit may change a mirror surface position of a door mirror device for a vehicle or an imaging direction of an imaging device that images vehicle surroundings.

Advantageous Effects of Invention

According to the present invention as described above, an effect is provided in that a duration of changing when a field of view is changed may be shortened.

DESCRIPTION OF EMBODIMENTS

Figure 1:
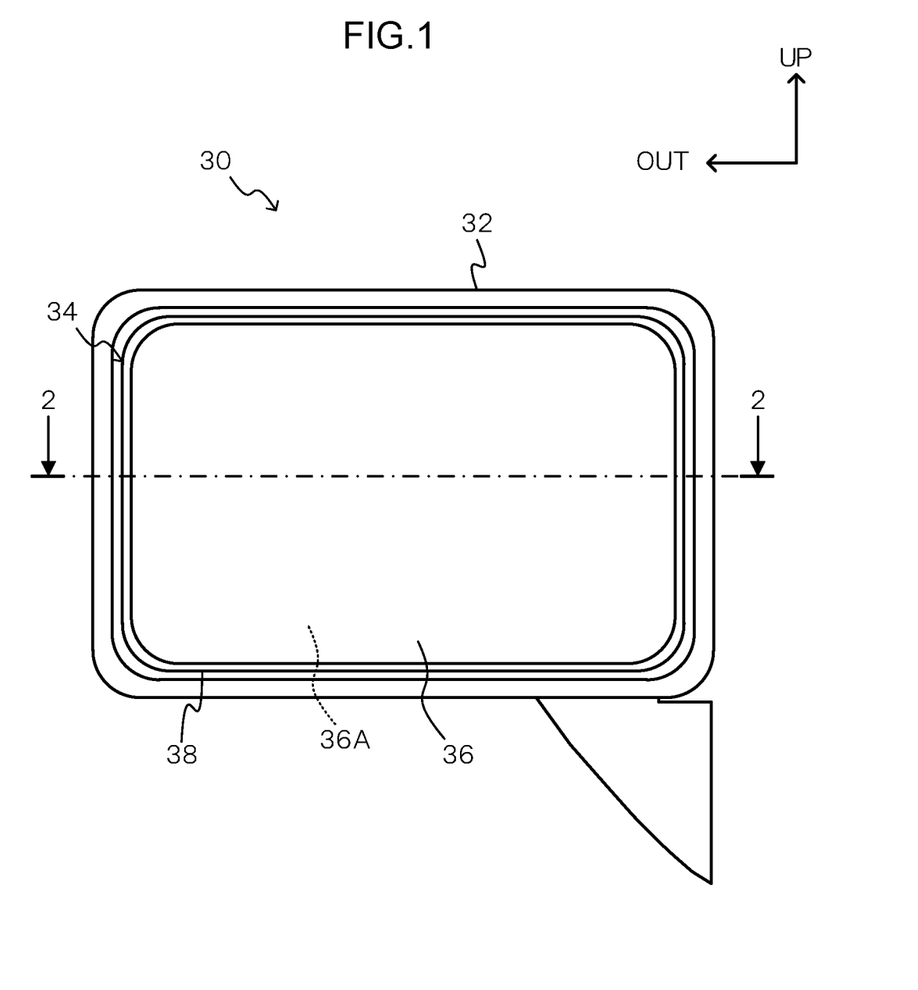
FIG. 1 is an exterior view of a vehicle door mirror device that is controlled by a door mirror control device according to an exemplary embodiment of the present invention.
Figure 2:
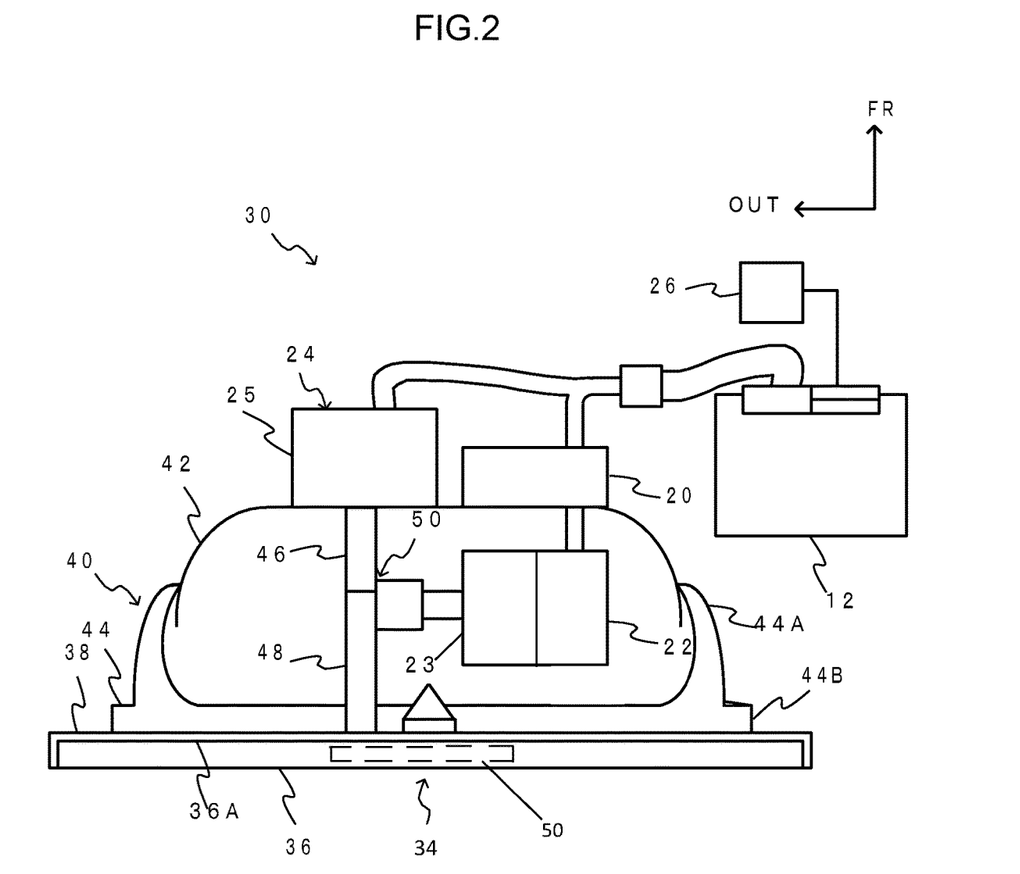
FIG. 2 is a sectional diagram (a sectional diagram cut along line 2-2 in FIG. 1) in which principal portions of the vehicle door mirror device are seen from above in a vehicle up-and-down direction (the vehicle upper side).

Herebelow, an example of an exemplary embodiment of the present invention is described in detail with reference to the attached drawings. A vehicle door mirror control device that is described below is an example of the view control device for a vehicle of the present invention. FIG. 1 is an exterior view of a vehicle door mirror device that is controlled by the door mirror control device according to the exemplary embodiment of the present invention. FIG. 2 is a sectional diagram (a sectional diagram cut along line 2-2 in FIG. 1) in which principal portions of the vehicle door mirror device are seen from above in a vehicle up-and-down direction (the vehicle upper side). In the drawings, the vehicle front is indicated by arrow FR, the vehicle width direction outer side (the vehicle right) is indicated by arrow OUT, and the upper side is indicated by arrow UP.

A vehicle door mirror device 30 is disposed at the outer side of the front end of an up-and-down direction middle portion of a door (a front door) of a vehicle.

As shown in FIG. 1, the vehicle door mirror device 30 is provided with a visor 32 in a substantially cuboid container shape that serves as an outer shell member. The vehicle door mirror device 30 is disposed at the door by a vehicle width direction inner side portion of the visor 32 being supported at the door (at the vehicle body). The interior of the visor 32 opens out to the vehicle rear side.

A mirror 34 in a substantially rectangular plate shape is provided inside the visor 32. The mirror 34 is disposed in the opening region of the visor 32. A mirror main body 36 (a mirror unit) is provided at a vehicle rear side region of the mirror 34. A reflective film that is a vehicle rear side surface of the mirror main body 36 is a mirror surface 36A. The vehicle front side and outer periphery of the mirror main body 36 are covered by a mirror holder 38 (a mirror holder outer).

As shown in FIG. 2, an electrically operated mirror surface adjustment unit 40 is provided inside the visor 32.

A case 42 in a substantially hemispherical container shape is provided at a vehicle front side region of the mirror surface adjustment unit 40. The interior of the case 42 opens to the vehicle rear side. The case 42 is supported at the visor 32. Thus, the mirror surface adjustment unit 40 is supported at the visor 32.

A tilting body 44 (a mirror holder inner) is provided at a vehicle rear side region of the mirror surface adjustment unit 40. The tilting body 44 is tiltably (swingably and turnably) retained at the case 42. A sliding tube 44A in a substantially cylindrical tube shape is provided at the tilting body 44. A diameter of the sliding tube 44A progressively decreases toward the vehicle front side. The sliding tube 44A is slideable against a periphery wall of the case 42. A mounting plate 44B in a substantially circular plate shape is integrally provided at the vehicle rear end of the sliding tube 44A. The mirror holder 38 of the mirror 34 is detachably mounted to the vehicle rear side of the mounting plate 44B. Thus, the mirror 34 is made tiltable relative to the case 42, integrally with the tilting body 44, about a center of gravity position thereof (a central position of the face of the mirror surface 36A).

An up-down motor 23 and an in-out motor 22 that serves as a change unit are fixed inside the case 42. An up-down rod (not shown in the drawings) and an in-out rod 48 in rod shapes are connected to, respectively, the up-down motor 23 and the in-out motor 22, via a gear mechanism 50 that serves as a mechanical mechanism. The up-down rod and the in-out rod 48 are retained inside the case 42 to be slideable (movable) in the vehicle front-and-rear direction (axial directions thereof). A distal end (vehicle rear end) of the up-down rod is turnably retained at the mounting plate 44B above (or possibly below) the center of gravity position of the mirror 34. A distal end (vehicle rear end) of the in-out rod 48 is turnably retained at the mounting plate 44B at the vehicle width direction outer side (or possibly vehicle width direction inner side) of the center of gravity position of the mirror 34.

The up-down motor 23 and the in-out motor 22 are electronically connected to an ECU 12 (a mirror ECU) that serves as a control unit via a mirror surface operation driver 20. The ECU 12 is provided inside the visor 32 or in the vehicle body. An adjustment control device 26 is electronically connected to the ECU 12. When the adjustment control device 26 is operated by an occupant of the vehicle (in particular a driver), the mirror surface adjustment unit 40 is operated under the control of the ECU 12 and drives the up-down motor 23 and the in-out motor 22. As a result, the up-down rod and the in-out rod 48 slide in the vehicle front-and-rear direction, and the tilting body 44 and mirror 34 are tilted relative to the case 42. Thus, a tilt position of the mirror 34 is adjusted and an angle of the mirror surface 36A of the mirror 34 (and a direction in which the mirror surface 36A faces) is adjusted.

When the up-down rod slides toward the vehicle front side, the tilting body 44 and mirror 34 are tilted upward (to an upward-facing direction), and the mirror surface 36A of the mirror 34 is tilted to the upward-facing direction. When the up-down rod slides toward the vehicle rear side, the tilting body 44 and mirror 34 are tilted downward (to a downward-facing direction), and the mirror surface 36A of the mirror 34 is tilted to the downward-facing direction. When the in-out rod 48 slides toward the vehicle front side, the tilting body 44 and mirror 34 are tilted outward (to an outward-facing direction), and the mirror surface 36A of the mirror 34 is tilted to the outward-facing direction. When the in-out rod 48 slides toward the vehicle rear side, the tilting body 44 and mirror 34 are tilted inward (to an inward-facing direction), and the mirror surface 36A of the mirror 34 is tilted to the inward-facing direction.

As shown in FIG. 2, an up-down sensor (not shown in the drawings) and an in-out sensor 24 are provided at the case 42. The up-down sensor and the in-out sensor 24 are both electronically connected to the ECU 12. A housing 25 in a substantially cuboid box shape is provided for both the up-down sensor and the in-out sensor 24. The housing 25 is fixed to the outer side of a floor face of the case 42. Thus, the up-down sensor and the in-out sensor 24 are fixed to the case 42.

Detection rods 46 in rod shapes are provided at the housing 25 to be slideable in the vehicle front-and-rear direction (axial directions thereof). Each detection rod 46 protrudes to the vehicle rear side from the housing 25 and is urged toward the vehicle rear side. The detection rod 46 penetrates through the floor wall of the case 42 and is inserted inside the case 42. Thus, the detection rods 46 of the up-down sensor and the in-out sensor 24 are disposed coaxially at the vehicle front side of, respectively, the up-down rod and the in-out rod 48. Distal ends (vehicle rear ends) of the detection rods 46 of the up-down sensor and the in-out sensor 24 are caused to touch the proximal ends (vehicle front ends) of the up-down rod and the in-out rod 48 by the urging forces. Thus, the detection rods 46 of the up-down sensor and the in-out sensor 24 may slide in the vehicle front-and-rear direction integrally with, respectively, the up-down rod and the in-out rod 48 at all times. Respective sliding positions in the vehicle front-and-rear direction of the detection rods 46 of the up-down sensor and the in-out sensor 24 are detected. Thus, the up-down sensor and the in-out sensor 24 detect respective sliding positions of the up-down rod and the in-out rod 48 in the vehicle front-and-rear direction, and the up-down sensor and the in-out sensor 24 detect tilt positions of the mirror 34 in the up-and-down direction and the in-and-out direction.

Figure 3:
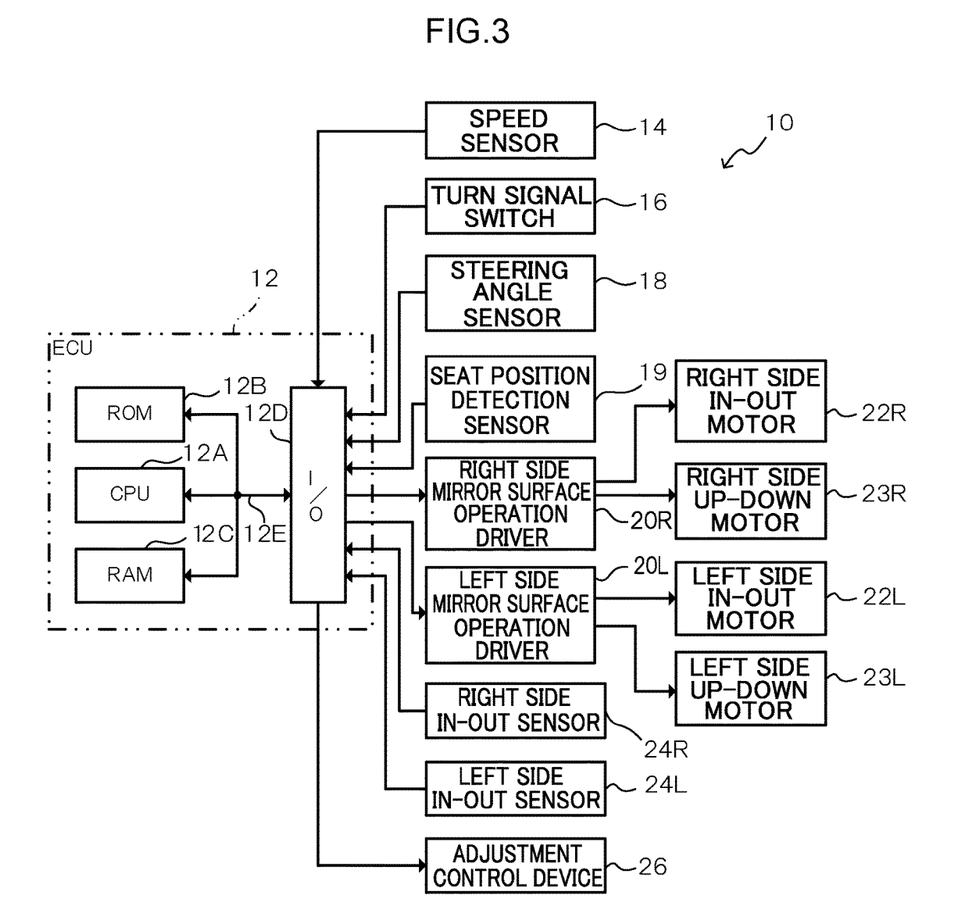
FIG. 3 is a block diagram showing a configuration of a control system of the vehicle door mirror control device according to the present exemplary embodiment.

FIG. 3 is a block diagram showing a configuration of a control system of a vehicle door mirror control device 10 according to the present exemplary embodiment.

The vehicle door mirror control device 10 is provided with the ECU 12 as mentioned above. The ECU 12 is structured by a microcomputer in which a CPU 12A, a ROM 12B, a RAM 12C and an input/output interface (I/O) 12D are each connected to a bus 12E.

A vehicle turn-associated mirror control program that is described below, various tables, various kinds of data such as numerical expressions, and the like are memorized in the ROM 12B. The program memorized in the ROM 12B is loaded into the RAM 12C and executed by the CPU 12A. Thus, control is performed to move the mirror surface 36A of the mirror 34 in association with vehicle turns. The program that is memorized in the ROM 12B is the vehicle turn-associated mirror control program as an example, but other programs may be memorized.

A speed sensor 14, a turn signal switch 16, a steering angle sensor 18 that serves as a detector, a seat position detection sensor 19, a right side mirror surface operation driver 20R, a left side mirror surface operation driver 20L, a right side in-out sensor 24R, a left side in-out sensor 24L, and the aforementioned adjustment control device 26 are connected to the I/O 12D.

The speed sensor 14 detects running speeds of the vehicle (below referred to as vehicle speeds) and inputs detection results to the ECU 12.

The turn signal switch 16 is a switch for commanding lighting of turn signals. The turn signal switch 16 inputs lighting commands for left and right turn signals to the ECU 12. Accordingly, the ECU 12 judges a vehicle occupant's intent to turn the vehicle on the basis of signals from the turn signal switch 16.

The steering angle sensor 18 detects steering angles of the steering (below referred to as "the steering angle") and inputs steering angle detection results to the ECU 12.

The seat position detection sensor 19 detects positions of a vehicle seat in the vehicle front-and-rear direction and inputs detection results to the ECU 12.

A right side up-down motor 23R and a right side in-out motor 22R are connected to the right side mirror surface operation driver 20R. The right side up-down motor 23R and right side in-out motor 22R are driven in accordance with commands from the ECU 12. A left side up-down motor 23L and a left side in-out motor 22L are connected to the left side mirror surface operation driver 20L. The left side up-down motor 23L and left side in-out motor 22L are driven in accordance with commands from the ECU 12.

The right side in-out sensor 24R detects tilt positions in the in-and-out direction of the mirror 34 at the right side, and the left side in-out sensor 24L detects tilt positions in the in-and-out direction of the mirror 34 at the left side. The right side in-out sensor 24R and left side in-out sensor 24L input respective detection results to the ECU 12. Although not shown in the drawings, the up-down sensor is correspondingly provided in each of the mirrors 34 and connected to the ECU 12.

Figure 4:
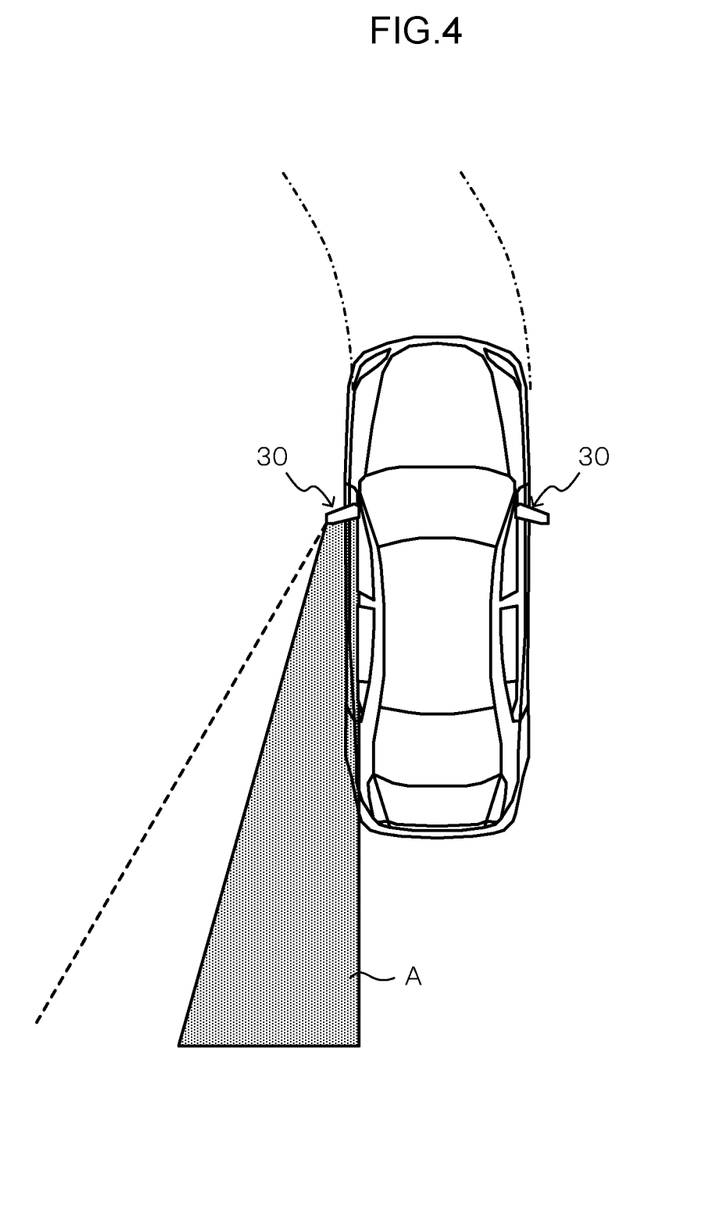
FIG. 4 is a view for describing vehicle turn-associated mirror control.

The vehicle turn-associated mirror control that is implemented by the vehicle door mirror control device 10 according to the present exemplary embodiment is now described. FIG. 4 is a view for describing the vehicle turn-associated mirror control.

The vehicle turn-associated mirror control is implemented by the ECU 12 executing the vehicle turn-associated mirror control program memorized in the ROM 12B.

When performing a vehicle turn such as a right turn or a left turn, a vehicle occupant looks at the vehicle door mirror device 30 and checks for path-crossing with a bicycle or the like. However, when the vehicle turn is started, a field of view of the vehicle surroundings for the vehicle occupant in the vehicle door mirror device 30 may, in association with the turn, depart from a region in which an object of checking for path-crossing such as a bicycle is present.

Because an object of checking may depart from the field of view during this turning of the vehicle, in the vehicle turn-associated mirror control, control is performed so as to tilt the mirror surface 36A of the mirror 34 and change the field of view in association with the turning of the vehicle.

Specifically, in a usual state such as a straight running state or the like, the vehicle occupant should set positions to be checked to a predetermined field of view range A, illustrated in FIG. 4. Then, when the vehicle is turning, turning amounts are detected from detection results from the speed sensor 14 and the steering angle sensor 18. In accordance with the detected turning amounts, the ECU 12 controls operations of the in-out motor 22 so as to tilt the mirror surface 36A and move the range A of the field of view toward the dotted line direction in FIG. 4. Therefore, path-crossing checking may be reliably carried out during the vehicle turn. As an example in the present exemplary embodiment, initial conditions of the vehicle turn-associated mirror control, which serve as a change condition for changing the field of view, commence when the turn signal switch 16 is switched on and the steering angle is at least a predetermined threshold value (for example, 4° or the like). For the tilting of the mirror surface 36A in accordance with turning amounts, movement amounts of the mirror surface 36A corresponding to turning amounts are memorized in the ECU 12 beforehand, movement amounts corresponding to turning amounts are read out, and the tilt is controlled accordingly.

In the present exemplary embodiment, an example is described in which the initial conditions for the vehicle turn-associated mirror control are the turn signal switch 16 being switched on and steering of at least a predetermined steering angle being detected, but change conditions are not limited thus. For example, detection results of other sensors such as an acceleration sensor and the like may be used as change conditions.

Figure 5A:
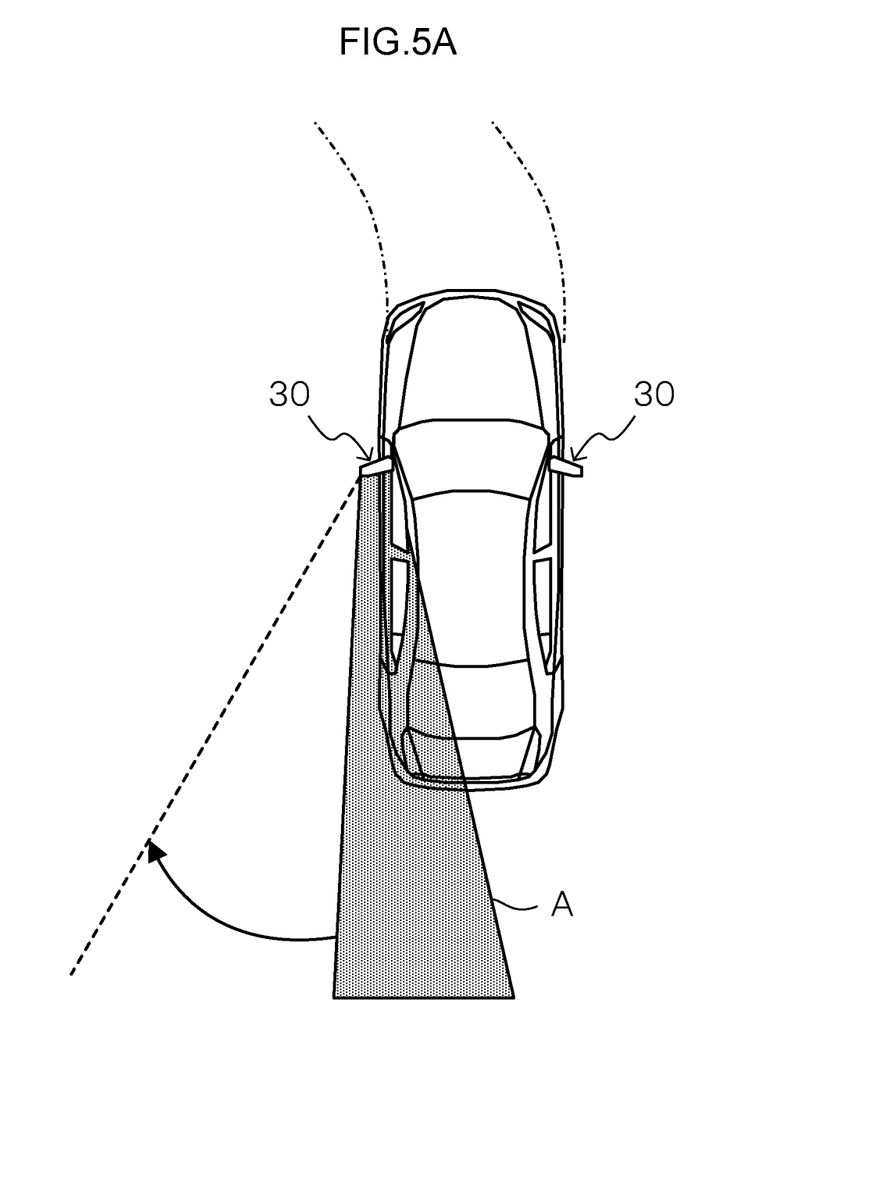
FIG. 5A is a view illustrating an example in which a field of view is set toward a vehicle inner side.
Figure 5B:
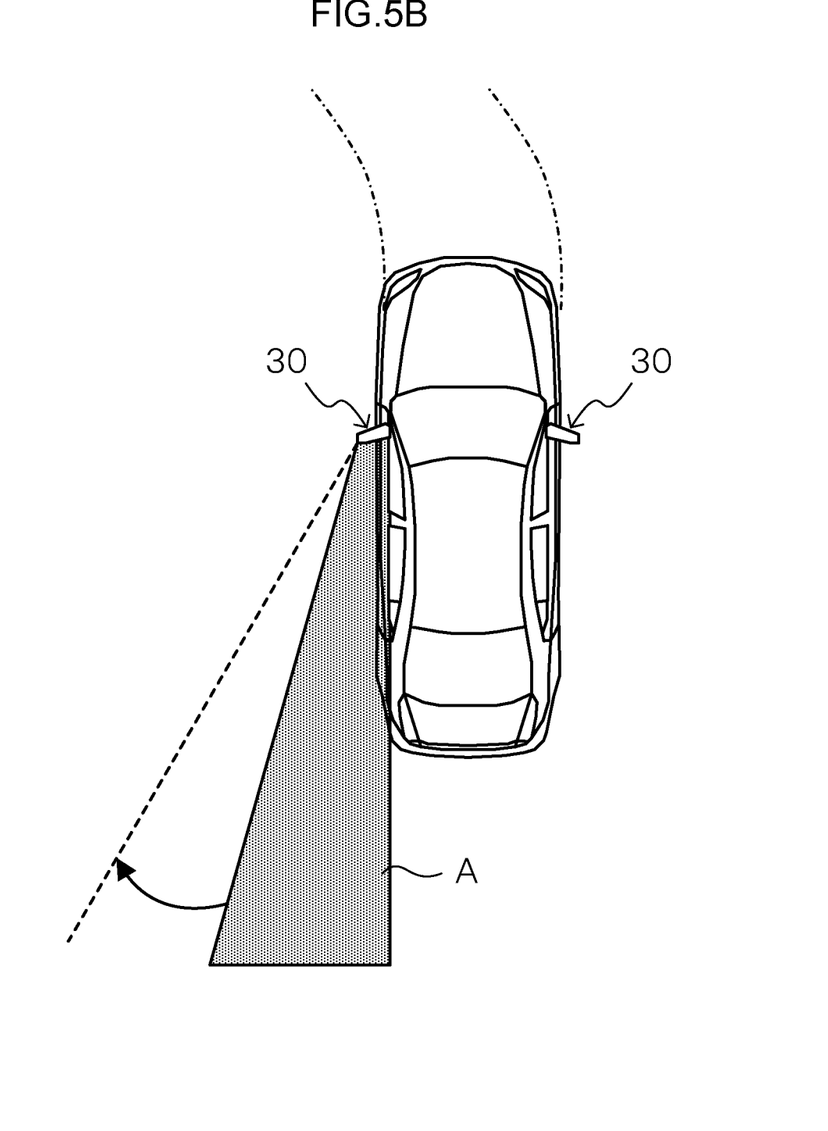
FIG. 5B is a view illustrating an example in which the field of view is set toward the vehicle outer side relative to FIG. 5A.

As described above, path-crossing checking during a vehicle turn may be performed reliably in accordance with the vehicle turn-associated mirror control. However, if the field of view has been set toward the vehicle inner side as shown in FIG. 5A, it takes more time to change the field of view to a target position than in a case in which, as shown in FIG. 5B, the field of view has been set further to the vehicle outer side than in FIG. 5A.

Therefore, in the present exemplary embodiment, when it is judged that a vehicle occupant intends to turn the vehicle, the position of the mirror surface 36A is controlled to move to a predetermined preparatory field. More specifically, if a predetermined condition (for example, a subset of plural conditions for starting the vehicle turn-associated mirror control) is satisfied before the predetermined change conditions for changing the field of view are satisfied, the mirror surface 36A is tilted so as to change to the preparatory field, which is a state in which a predetermined standard field of view can be seen. In other words, differences between fields of view of different vehicle occupants can be eliminated in advance by setting the mirror surface 36A to the predetermined preparatory field before starting the vehicle turn-associated mirror control. As a result, a duration of movement of the mirror surface 36A to the target position when the field of view is being changed may be shortened.

For example, a field of view in which a portion of a side face at the vehicle rear can be seen may be used as the preparatory field. The preparatory field varies depending on the positions of eyepoints of vehicle occupants. Therefore, the mirror surface 36A must be adjusted to a position depending on the vehicle occupant. In the present exemplary embodiment, the position of an occupant's eyepoint is estimated from a seat position detected by the seat position detection sensor 19, and the preparatory field corresponding to the estimated eyepoint is derived. In specific terms, seat positions and preparatory field positions of the mirror surface 36A for corresponding eyepoints are associated and memorized in advance. Hence, the position of the mirror surface 36A for the preparatory field is derived from the seat position. Alternatively, in order to simplify configuration, a predetermined standard position of the mirror surface 36A may be specified in advance as the position for the preparatory field.

Figure 6:
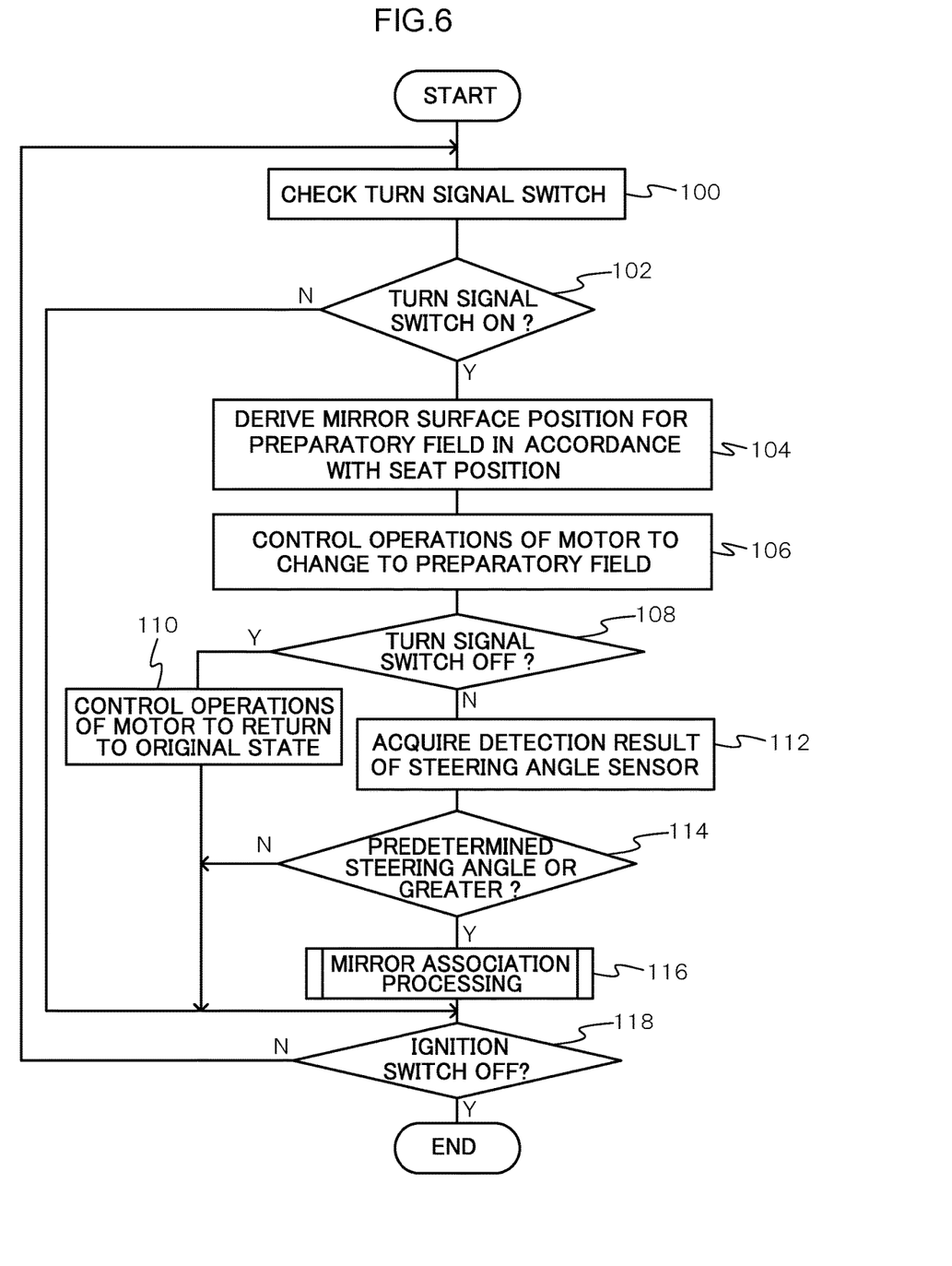
FIG. 6 is a flowchart showing an example of a flow of processing that is executed by an ECU of the vehicle door mirror control device according to the present exemplary embodiment.

Now, specific processing that is carried out by the ECU 12 of the vehicle door mirror control device 10 according to the present exemplary embodiment structured as described above is described. FIG. 6 is a flowchart showing an example of the flow of processing that is executed by the ECU 12 of the vehicle door mirror control device 10 according to the present exemplary embodiment. The processing in FIG. 6 illustrates an example in which the processing starts when an ignition switch that is not shown in the drawings is switched on.

First, in step 100, the ECU 12 checks an operational state of the turn signal switch 16, and then proceeds to step 102.

In step 102, the ECU 12 makes a determination as to whether the turn signal switch 16 has been switched on. If the result of this determination is affirmative, the ECU 12 proceeds to step 104, and if the result is negative, the ECU 12 proceeds to step 116.

In step 104, the ECU 12 derives the position of the mirror surface 36A for the preparatory field on the basis of a seat position detected by the seat position detection sensor 19, and then proceeds to step 106. For example, the ECU 12 reads a position of the mirror surface 36A for the preparatory field that has been associated with that seat position and memorized beforehand.

In step 106, by controlling the mirror surface operation driver 20, the ECU 12 controls operations of the in-out motor 22 so as to change the mirror surface 36A to the derived position for the preparatory field, and then proceeds to step 108. For example, if the field of view is the range A shown in FIG. 5A, the mirror surface 36A is moved to the range A shown in FIG. 5B. Thus, when the vehicle turn-associated mirror control is subsequently performed, a duration of movement to the target position may be made shorter than moving the mirror surface 36A from the state shown in FIG. 5A. In step 106, the operations of the in-out motor 22 are controlled in correspondence with the direction to which the turn signal switch 16 is switched on (right or left).

In step 108, the ECU 12 makes a determination as to whether the turn signal switch 16 has been switched off. If the result of this determination is affirmative, the ECU 12 proceeds to step 110, and if the result is negative, the ECU 12 proceeds to step 112.

In step 110, the ECU 12 controls the mirror surface operation driver 20, controlling operations of the in-out motor 22 so as to return the mirror surface 36A from the preparatory field to the original state, and the ECU 12 proceeds to step 118.

In step 112, the ECU 12 acquires a detection result from the steering angle sensor 18, and the ECU 12 proceeds to step 114.

In step 114, the ECU 12 makes a determination as to whether the steering angle detected by the steering angle sensor 18 is at least a predetermined steering angle. If the result of this determination is affirmative, the ECU 12 proceeds to step 116, and if the result is negative, the ECU 12 proceeds to step 118.

In step 116, the ECU 12 executes mirror association processing and then proceeds to step 118. The mirror association processing is, for example, the ECU 12 calculating a turning amount from the respective detection results of the steering angle sensor 18 and the speed sensor 14, and controlling operations of the in-out motor 22 so as to move the mirror surface 36A to a predetermined position corresponding to this turning amount. More specifically, this control orients the mirror surface 36A to the outer side when the turning amount is greater, such that a range to the outer side can be seen. The movement of the mirror surface 36A in association with a vehicle turn may be controlled such that the mirror surface 36A moves back to its original position when the steering angle starts to decrease. Alternatively, the mirror association control may be completed and control performed so as to move the mirror surface 36A back to the original position when the steering angle is a steering angle that can be judged to be a straight running state. Alternatively again, the mirror association processing may be completed and control performed so as to move the mirror surface 36A back to the original position when an alternative condition is satisfied.

In step 118, the ECU 12 makes a determination as to whether the ignition switch has been switched off. If the result of this determination is negative, the ECU 12 returns to step 100 and carries out the processing described above. If the result is affirmative, the ECU 12 ends this sequence of processing.

Figure 7:
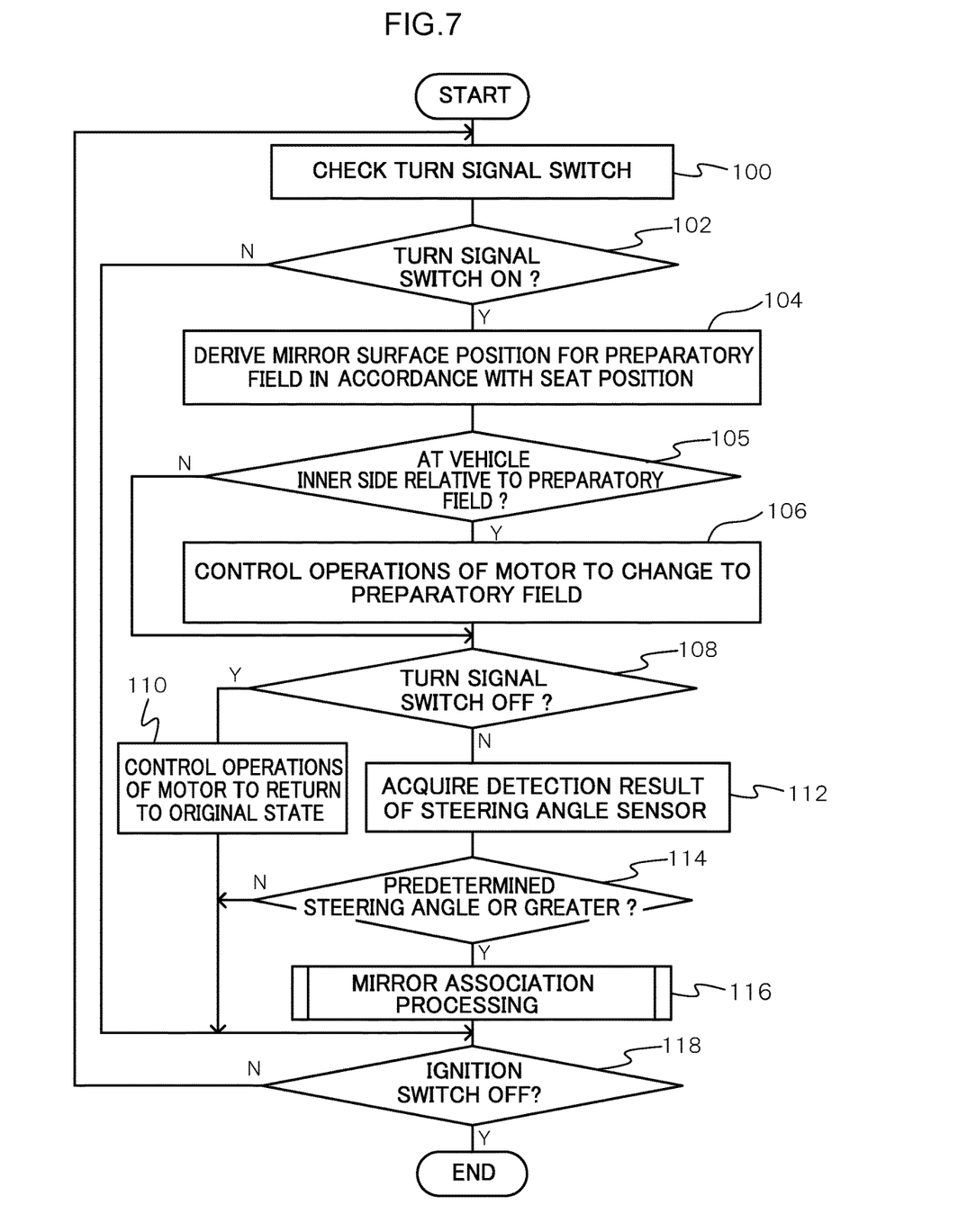
FIG. 7 is a flowchart showing a variant example of the flow of processing that is executed by the ECU of the vehicle door mirror control device according to the present exemplary embodiment.

In the above description, control is performed in step 106 to change the mirror surface 36A to the preparatory field when the turn signal switch 16 is switched on, regardless of the position of the mirror surface 36A. However, step 106 may be skipped if the current position of the mirror surface 36A is at the vehicle outer side relative to the preparatory field. Specifically, as shown in FIG. 7, step 105 may be added, in which the ECU 12 makes a determination as to whether the current field of view is at the vehicle inner side relative to the preparatory field. This determination is made by comparing a position of the mirror surface 36A detected by the in-out sensor 24 with the position of the mirror surface 36A for the preparatory field derived in step 104. If the result of this determination is affirmative, the ECU 12 proceeds to step 106, and if the result is negative, the ECU 12 proceeds to step 108. As a result, the duration of changing to the target position when changing the field of view in accordance with a vehicle turn may be further shortened.

Figure 8:
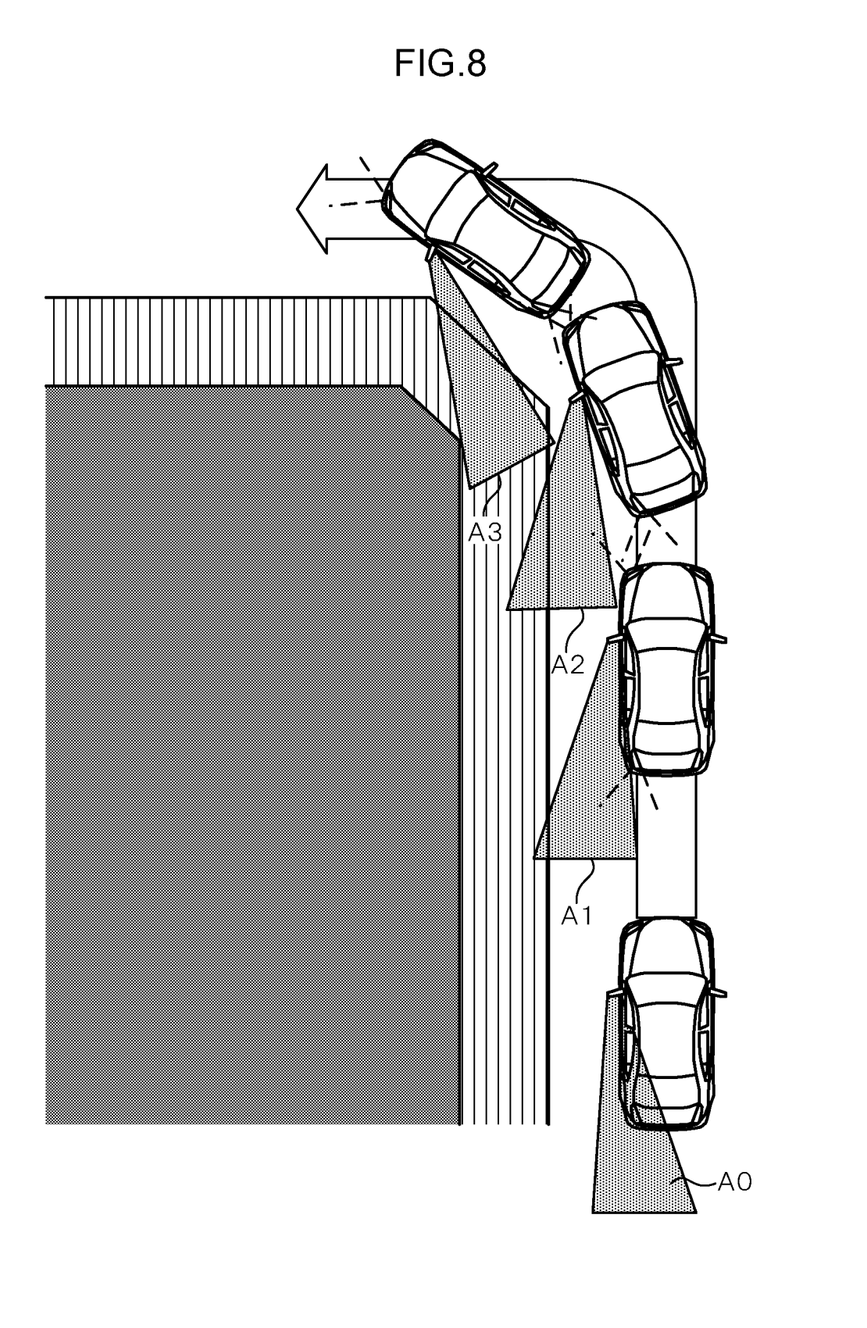
FIG. 8 is a diagram for describing an example of operation of the vehicle door mirror control device according to the present exemplary embodiment during a left turn.

Now, the above processing is described taking a case of turning left as an example. FIG. 8 is a diagram for describing this example of operation of the vehicle door mirror control device 10 according to the present exemplary embodiment during the left turn.

During a straight running state, as shown in FIG. 8, the vehicle door mirror device 30 has been set by a vehicle occupant to a position in which a predetermined range A0 can be seen (an initial state). Intending to turn left, the vehicle occupant switches on the turn signal switch 16, lighting the turn signal (see the dotted lines in FIG. 8) and satisfying a subset of the conditions for starting the vehicle turn-associated mirror control. Operations of the in-out motor 22 are controlled so as to change the mirror surface 36A to the position for the preparatory field. As a result, as shown in FIG. 8, the mirror surface 36A moves, changing from the viewable range A0 to the viewable range A1, which is the preparatory field.

Then, when the steering is operated by the vehicle occupant in order to turn the vehicle and the steering angle becomes at least a predetermined steering angle, the vehicle turn-associated mirror control starts and the mirror surface 36A is controlled to move to the vehicle outer side, moving from the viewable range A1 to the range A2 further to the outer side of the vehicle as shown in FIG. 8. Hence, the mirror surface 36A moves in accordance with turn amounts. Thus, as shown in FIG. 8, the viewable range successively moves from range A1 to range A3, the range in which a bicycle or the like that is an object of checking for path-crossing may be present can be seen, and an object of checking for path-crossing will not be lost from view.

Thus, in the present exemplary embodiment, control to change to the preparatory field is performed when a predetermined condition is satisfied (in the present exemplary embodiment, when a subset of conditions for starting the vehicle turn-associated mirror control is satisfied). Therefore, if a current viewable range is at the vehicle inner side relative to the preparatory field, a duration of changing the field of view to a target position may be shortened.

In the exemplary embodiment described above, the vehicle door mirror control device 10 is described as an example of the view control device for a vehicle, but this is not limiting. For example, the present invention may be applied to a structure that controls a rear view mirror or the like instead of the vehicle door mirror device 30. Alternatively, an imaging device 50 (indicated in phantom in FIG. 2) such as a camera or the like may be employed instead of the vehicle door mirror device 30 and the present invention applied to operation of an imaging direction of the imaging device 50 in association with a vehicle turn. If the present invention is applied to an imaging device 50 such as a camera, a configuration may be employed in which, rather than the imaging direction being changed to change the direction of the field of view, a field to which a captured image is cropped for display to the vehicle occupant is changed.

The exemplary embodiment described above is described taking as an example a view control device for a vehicle that controls changes of a field of view for a vehicle occupant to the rear side of the vehicle. However, the field of view is not limited to the rear and side; changes of a field of view toward the front or side may be controlled. For example, a view control device for a vehicle may be employed in which a region that is a blind spot in front of the vehicle or to the side of the front is imaged by an imaging device 50 and changes of this field of view are controlled, or the like.

In the exemplary embodiment described above, the predetermined condition is that control to change to the preparatory field is performed when the turn signal switch 16 is switched on, but the predetermined condition is not limited thus. For example, control to change to the preparatory field may be performed when a steering angle that is at least a predetermined steering angle is detected. Alternatively, in association with navigation by a navigation system, control to change to the preparatory field may be performed when a vicinity of a left or right turn guidance position is reached. Alternatively again, changes in traffic lanes may be detected on the basis of information from various sensors, a navigation system or the like, and control to change to the preparatory field may be performed when a change of traffic lanes is detected.

The present invention is not limited by the above recitations. In addition to the above recitations, it will be clear that numerous modifications may be embodied within a technical scope not departing from the gist of the invention.

The disclosures of Japanese Patent Application No. 2014-237593 filed Nov. 25, 2014 are incorporated into the present specification by reference in their entirety.

The invention claimed is:

1. A view control device for a vehicle, comprising:
a motor assembly that changes a field of view of vehicle surroundings for a vehicle occupant; and
an electronic controller that, in a case of establishment of a predetermined condition that is before establishment of a preset change condition under which the viewing range is to be changed and the field of view is set toward a vehicle inner side from a predetermined preparatory field, controls the motor assembly so as to change the field of view to the predetermined preparatory field,
wherein, in a case in which the change condition is satisfied after the change to the preparatory field, the electronic controller further controls the motor assembly so as to change the field of view in association with turning of the vehicle,
wherein:
in a case in which a turn signal switch is switched on as the predetermined condition, the electronic controller controls the change unit so as to change to the preparatory field; and,
in a state, in which the turn signal switch is switched on and a steering angle that is at least a predetermined steering angle is detected by a detector that detects the steering angle, as the change condition, the electronic controller controls the motor assembly so as to change the field of view associated with turning, and
the predetermined preparatory field is a fixed, constant field of view that is discrete from the field of view associated with turning.

2. The view control device for a vehicle according to claim 1, wherein the preparatory field is a field in which a portion of a side of the rear of the vehicle can be seen.

3. The view control device for a vehicle according to claim 1, wherein the motor assembly changes a mirror surface position of a door mirror device for a vehicle or an imaging direction of an imaging device that images vehicle surroundings.

4. The view control device for a vehicle according to claim 1, wherein the change condition includes a plurality of conditions for starting a control of the view successively in accordance with turn amounts, and the predetermined condition is a subset of the plurality of conditions.

* * * * *